Oct. 23, 1934.  J. S. REID  1,978,326
CHANNEL STRUCTURE
Filed May 18, 1931
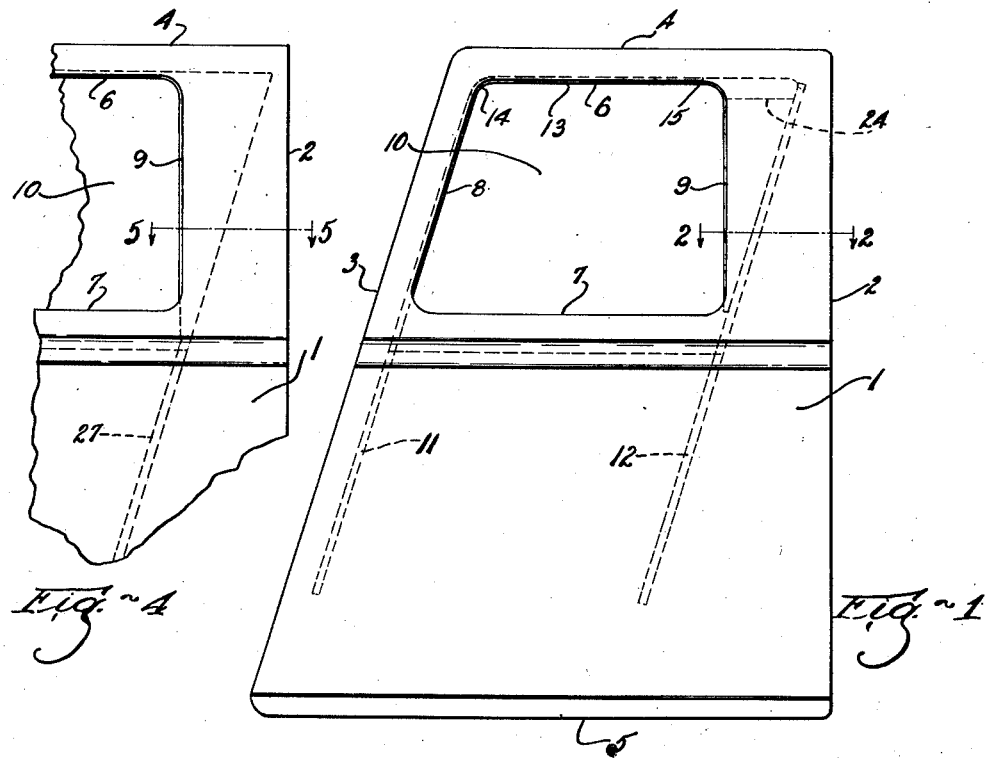
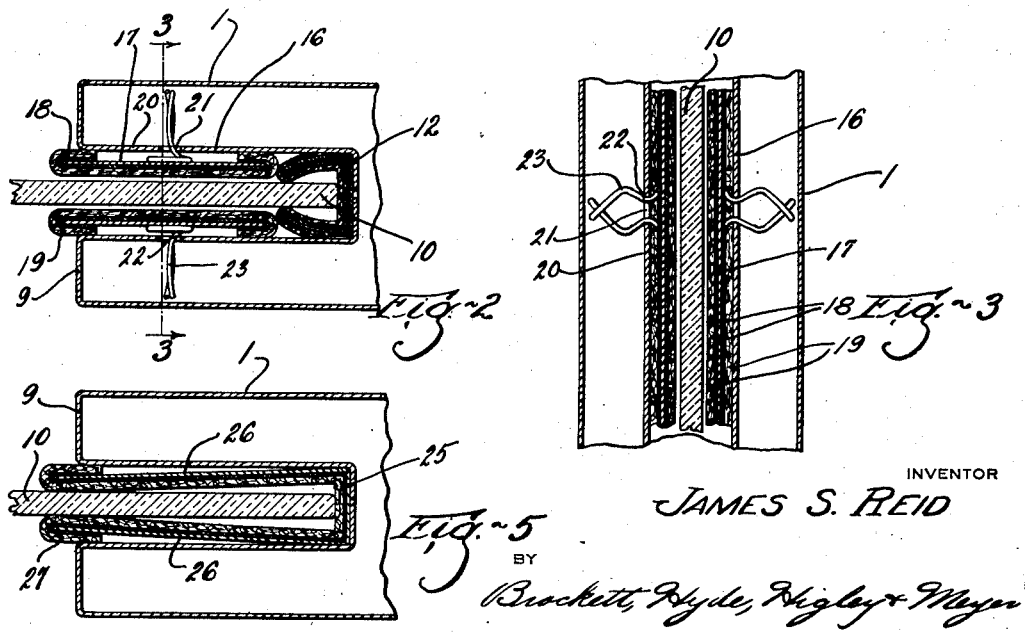
INVENTOR
JAMES S. REID
BY
Brockett, Hyde, Higley & Meyer
ATTORNEYS Patented Oct. 23, 1934

1,978,326

UNITED STATES PATENT OFFICE 1,978,326

CHANNEL STRUCTURE

James S. Reid, Shaker Heights, Ohio, assignor to The Reid Products Company, Cleveland, Ohio, a corporation of Ohio Application May 18, 1931, Serial No. 538,346

1 Claim. (Cl. 296—44.5)

The invention disclosed in this application relates to channel structures for use in automobile windows and the like, and has particular reference to odd-shaped window openings in the doors, and the like.

In connection with the windows of motor vehicles, some manufacturers prefer to have windows of odd shapes, that is, the window openings are other than rectangular and many times have sides, some of which are inclined, so that in order to slide the glass pane properly along one side, it is necessary to leave the opposite side, which is not in parallelism with the first mentioned side, unsupplied with the edges of the glass run channel, so that an unsightly appearance is produced in the gap between the sides of the window groove and the glass pane.

The object of the present invention is to either extend the side flanges of the channel out to the standard point just beyond the edges of the window opening and close the gaps at these points, or to provide false members which accomplish the same results, the channel remaining of the standard form in the back part of the window groove.

The features of the invention are well disclosed in the following description, drawing and claim.

Referring to the drawing, Fig. 1 represents the door of a motor vehicle provided with a window opening having top and bottom edges and an inclined straight front edge and a substantially vertical rear edge; Fig. 2 is a section upon the line 2—2 of Fig. 1; Fig. 3 is a fragmental sectional view taken vertically upon the transverse line 3—3 of Fig. 2; Fig. 4 shows a modified form of channel portion used in place of the channel used at the rear portion and opposite to the window where the sides of the channel are extended out to the exposed edges thereof beyond the vertical edges of the window groove; and Fig. 5 is a section upon the line 5—5 of Fig. 4.

In the embodiment shown, 1 represents the door of a motor vehicle having a straight rear edge 2 and an inclined front edge 3, the top edge 4 and the bottom edge 5 being substantially parallel. This door is provided with a window opening having a top edge 6 and a bottom edge 7 in parallel relation, and a front edge 8 inclined substantially in parallelism with the edge 3 of the door and a substantially vertical edge 9 at the rear. The corners of all meeting edges are curved, as shown. This door is of the usual hollow form and the glass pane 10 is of more or less diamond shape, the front and rear edges being parallel for sliding purposes, and the top and bottom edges being parallel also. Mounted within the door in any suitable manner and in the normal window grooves at the window openings are the front and rear glass run channels 11 and 12 respectively. As shown in Figs. 1 and 2, they may be continuous throughout. At the top is a header channel 13 having a front curved end 14 being and substantially forming a continuation of the front glass run channel 11. It may be extended around the upper rear curve of the window opening or may be stopped short of such curve, as shown at 15.

The window channel is extended back into the door structure and is of gradual uniform continuing depth from the bottom to the top to provide a substantially triangular channel, shown indicated at 16 in Fig. 2. It is obvious that on account of the necessity for such a channel, where a parallel front and rear edge window pane is used, that the side flanges of the normal glass run channel will not reach out to and close the gaps at the edges of the window opening at the glass and an unsightly undesirable gap is therefore provided on the front and rear of the glass. In order to close this gap, as shown in Figs. 1 and 2, additional side flange members are provided and they comprise triangular sheets 17 of a suitable shape to extend from the glass run channel out beyond the edges of the window groove at the window opening, as clearly shown in Fig. 2. Each one of these additional side flange members has its sheet 17 coated with rubber 18 and an outer coating of felt 19.

These additional members may be secured in the channel in any suitable manner when the door is built, and where metal framing is used the inner flange 20 is provided with openings 21, which receive spring clips carried by the plate 17. A suitable clip for the purpose may be made of two associated spring wires 22 bent outwardly at an angle, as at 23, in bowlegged construction so that the points may be inserted in the openings 21 and forced in with the outward bends 23 snapping past the edge of the opening and the wire springing outwardly and securing the member in place. These members may extend to a point, as indicated at 24, shown in dotted lines in Fig. 1 and the upper header glass run channel extended around the curve to meet it, or the side flange members may be extended up around the curve, as shown in dotted lines in Fig. 4. In any event, the glass run channel effect present at the front and top of the door is continued at the rear where the glass extends away back into the channel and no unsightly gaps are presented at this point due to the glass run channel being straight in the back of the window groove and away from the edges.

In a modification shown in Figs. 4 and 5, a special odd-shaped channel is formed. It is triangular in construction and has side flange portions which gradualy decrease in depth from the top to the bottom. Such a channel, as shown in Fig. 5, comprises the inner spring metal core 25, side flanges 26 and the usual covering 27. In this case, as in the construction shown in Figs. 1 and 2, this triangular channel member may extend to the line 24, Fig. 1, or may be continued up around the curved corner 16, as shown in Fig. 1. This channel member is continued down below the door opening and the further glass run channel for the window pane may be provided in the regular way by the channel section 27, Fig. 4.

Having described my invention, I claim:

The combination with a hollow frame having a window opening, a glass pane slidable in said frame and adapted to cover and expose said opening, said pane, when in closing position, having its edge portions extending into said frame varying distances from the edges of said opening, a channel structure arranged in said frame about said opening and adapted to receive the edge portions of said glass pane when said pane is in closing position, said channel structure comprising a channel member of uniform depth throughout and a pair of side members extending from the side walls of said channel member to the edges of said frame opening, said side members being of varying depth to compensate for the extension of said glass pane, when in closing position, varying distances into said frame from the edges of said opening, and means for detachably connecting said side members to said frame.

JAMES S. REID.